United States Patent [19]

White, IV

[11] Patent Number: 4,966,387
[45] Date of Patent: Oct. 30, 1990

[54] SUPPLEMENTAL SUSPENSION SYSTEM AND METHOD FOR SUPPLEMENTING THE SUSPENSION SYSTEM OF A VEHICLE

[76] Inventor: Thomas E. White, IV, P.O. Box 386, Haughton, La. 71037-0386

[21] Appl. No.: 359,636

[22] Filed: May 31, 1989

[51] Int. Cl.[5] ............................................. B60G 11/46
[52] U.S. Cl. ...................................... 280/712; 267/31; 267/241
[58] Field of Search ............... 280/712, 713, 718, 676, 280/683, 686; 267/31, 241

[56] References Cited

U.S. PATENT DOCUMENTS

| | | | |
|---|---|---|---|
| 1,679,268 | 7/1928 | Rigney | 267/241 |
| 3,315,979 | 4/1967 | Chalmers | 280/678 |
| 3,664,452 | 5/1972 | Schaeff | 267/31 |
| 3,850,445 | 11/1974 | Borns et al. | 280/712 |
| 4,181,324 | 1/1980 | Hixon | 280/713 |
| 4,406,479 | 9/1983 | Chalmers | 280/678 |
| 4,687,222 | 8/1987 | Chalmers | 280/683 |

Primary Examiner—David M. Mitchell
Assistant Examiner—Karin Tyson
Attorney, Agent, or Firm—Cushman, Darby & Cushman

[57] ABSTRACT

A supplemental suspension and method of supplementing the suspension in a vehicle having an axle, wheels rotatably disposed on the axle, a frame and an existing leaf spring suspension system for mounting the axle onto the frame. The supplementary suspension system includes first and second suspension arm members having front and rear ends, a cross member for connecting the two arm members, hanger means for pivotally suspending the rear ends of the arm members from the frame of the vehicle, mounting means for mounting the front ends of the arm members on the axle, and air suspension means for operably connecting a portion of the suspension arm members disposed between the front and rear ends of the members to the vehicle frame. The air suspension means further includes air bags, wherein the degree of suspension of the suspension means can be adjusted by altering the amount of air in the air bags. The arm members preferably have a generally "U" shape when viewed from a side of the vehicle. One leg of the "U" shape comprises the rear end of the arm member for suspension from the hanger means, and the other leg of the "U" shape comprises the front end of the frame member for mounting on the axle. The air suspension means is disposed toward the bottom of the "U" shape.

12 Claims, 2 Drawing Sheets

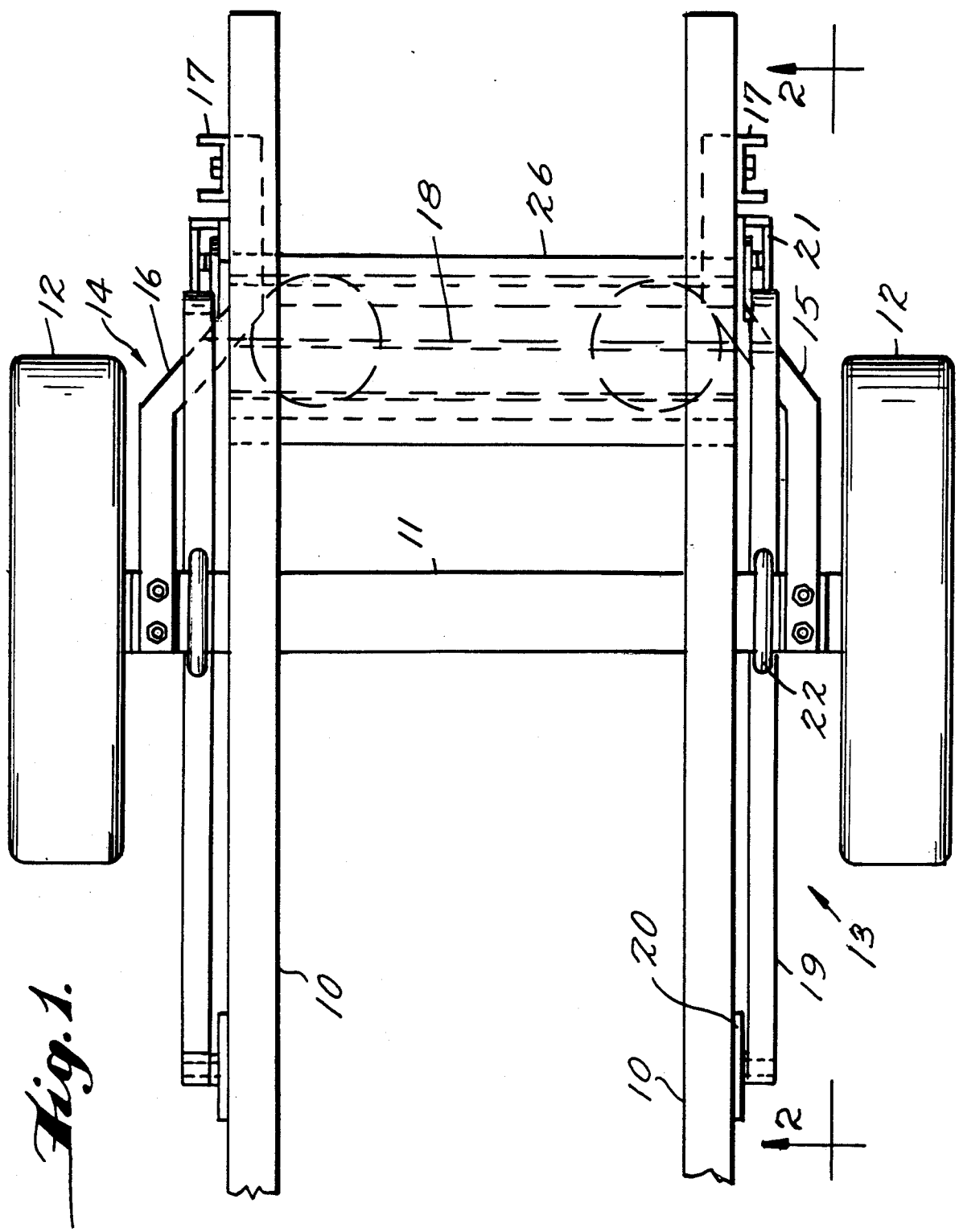

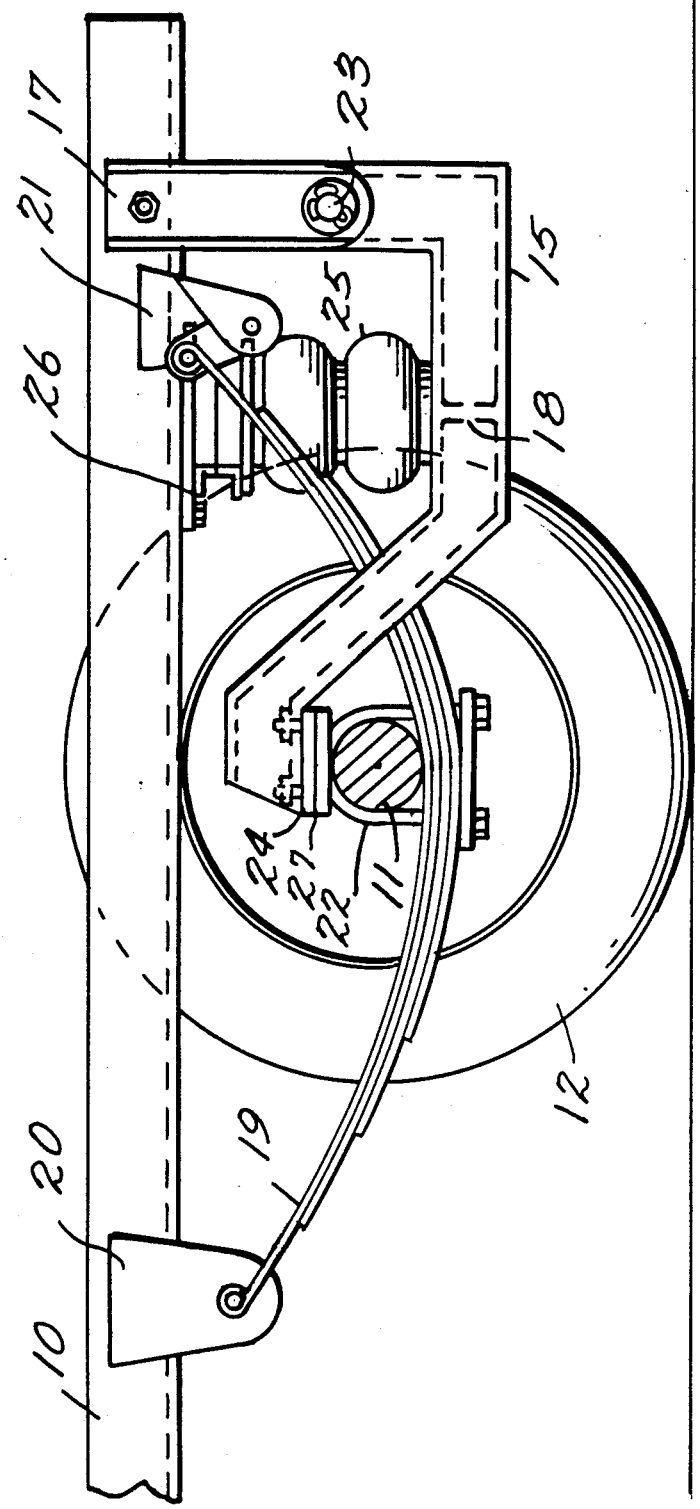

SUPPLEMENTAL SUSPENSION SYSTEM AND METHOD FOR SUPPLEMENTING THE SUSPENSION SYSTEM OF A VEHICLE

BACKGROUND OF THE INVENTION

The present invention relates to a supplemental suspension system for vehicles such as small trucks. More particularly, the invention relates to a method for supplementing the suspension of vehicles such as small trucks.

Conventional small truck chassis have a pair of leaf spring assemblies which connect the axle housing to the frame of the truck. The conventional leaf spring suspension system functions well under the heavy loads for which it was designed, but does not proVide a very comfortable ride when empty.

In order to soften the suspension and provide a smoother ride, it is possible to remove the heavier load bearing springs, but this sacrifices the load bearing capacity of the vehicle.

Heretofore, air suspension systems have been proposed to soften the suspensions of small trucks, but the prior art suspensions are complicated and difficult to install. In many cases, the prior art suspensions can only be added after the existing suspension has been entirely removed. Some prior art suspensions require significant alteration to the truck chassis, which is both expensive and inconvenient. Installation of these prior art suspensions requires readjustment of the tracking of the vehicle and realignment.

A vehicle suspension system incorporating air springs is disclosed in U.S. Pat. No. 4,580,809, to Leaf. The suspension system of the patent would require that the existing leaf springs be cut roughly in half, the axle would rest on the cut-off end of the springs. An air spring would be connected to the leaf springs by a spring seat, and the air spring would be disposed to the rear of the axle and between the spring seat and the frame of the vehicle. The suspension of the patent could only be installed after much labor and significant alteration of the existing leaf spring suspension system. The disclosed suspension also requires a torque arm to hold the axle and frame in lateral alignment.

A method for converting a conventional truck chassis to an air suspension system is disclosed in U.S. Pat. No. 4,580,798. In order to install the suspension of the patent, it is necessary to remove all load-bearing springs and to cut the main leaf spring in half. The remaining half leaf spring is used to support the L-shaped arms of the air suspension system. The air springs are mounted toward the rear of the vehicle between the L-shaped arms and the frame. This prior art suspension also requires the virtual total removal of the existing suspension and significant installation work. Systems similar to the above prior art suspension are disclosed in U.S. Pat. Nos. 3,802,718 and 3,531,099.

An air cushion system for installation on existing suspension systems is disclosed in U.S. Pat. No. 3,499,662, to Paul. In the system according to this patent, an air container is inserted between the vehicle frame and the spring suspension structure to separate the normal bearing surface of the spring suspension from the frame when the vehicle is unloaded, or to Otherwise modify the assoCiation between the frame and spring suspension to substitute the cushioning of the air spring for the stiffness of the normal leaf spring suspension. The system disclosed in the patent is attached to the ends of existing leaf springs, and works by lifting the vehicle either partially or totally from the spring hangers. The prior art suspension works directly through the existing system and therefor does not allow the removal of the heavier load-bearing springs to soften the ride.

Other prior art air suspension systems are disclosed in U.S. Pat. Nos. 3,664,681 and 3,866,894.

It is therefore an object of the present invention to provide a supplemental air suspension system and load leveler for vehicles such as small trucks.

It is an additional object of the present invention to provide a supplemental air suspension system which can be easily installed while maintaining the factory tracking and alignment of the vehicle.

It is yet another object of the present invention to provide a supplemental air suspension system capable of being mounted on both drive axles and other axles.

A further object of the present invention is to allow the removal of the heavier load-bearing springs without sacrificing the load-bearing capacity of the entire suspension.

Another object of the present invention is to provide a method for supplementing a conventional vehicle chassis with an air suspension system in an economical fashion with a minimum of alteration to the vehicle chassis.

A still further object of the present invention is to supplement the existing suspension of a vehicle, while retaining and using the main leaf spring in its entirety, and using only those load bearing springs sufficient to control axle torque during heavy braking or operation of the vehicle.

SUMMARY OF THE INVENTION

In accordance with the above objects, the present invention provides, in a vehicle having an axle, wheels rotatably disposed on the axle, a frame and an suspension system for mounting the axle onto the frame, a supplementary air suspension system suspending the axle from the frame. The supplementary suspension system comprises first and second suspension arm members having front and rear ends, a cross member for connecting the two arm members, hanger means for pivotally suspending the rear ends of the arm members from the frame of the vehicle, mounting means for mounting the front ends of the arm members on the axle, and air suspension means for operably connecting a portion of the suspension arm members disposed between the front and rear ends of the members to the vehicle frame.

In a preferred embodiment, the air suspension means further comprises air bags, wherein the degree of suspension of the suspension means can be adjusted by altering the amount of air in the air bags.

The existing suspension is preferably a leaf spring suspension.

The arm members preferably have a generally "U" shape when viewed from a side of the vehicle. One leg of the "U" shape comprises the rear end of the arm member for suspension from the hanger means, and the other leg of the "U" shape comprises the front end of the frame member for mounting on the axle. The air suspension means is disposed toward the bottom of the "U" shape.

In accordance with another embodiment, the present invention provides a method for supplementing existing suspension system of a vehicle.

In accordance with a further embodiment, the invention provides a method for supplementing the suspension system of a vehicle having an axle, wheels rotatably disposed on the axle, a frame and a leaf spring suspension system for mounting the axle onto the frame. The method comprises removing one or more load bearing springs from the leaf spring suspension system. First and second hangers are attached on the frame of the vehicle behind the axle with respect to a front of the vehicle. First and second generally U-shaped suspension arm members are suspended from the first and second hangers, respectively, wherein each of the first and second arm members has front and rear ends and a bottom, and wherein the rear end of each arm member is pivotally attached to a respective hanger. The front end of each arm member is attached to the axle. Air suspension means are provided attached to the bottom of each arm and operatively connected to the frame.

Further objects, features and embodiments of the present invention will become apparent from the Brief Description of the Preferred Embodiment, which follows, in conjunction with the attached figures of drawing.

BRIEF DESCRIPTION OF THE DRAWINGS

In the drawings:

FIG. 1 shows a top plan view of a vehicle frame and suspension system incorporating the supplemental suspension system of the present invention; and FIG. 2 shows a side view in partial cross section of one side of the vehicle incorporating the supplemental suspension of the present invention.

DETAILED DESCRIPTION OF THE PREFERRED EMBODIMENT

The invention will now be described with reference to the figures in which like parts are represented by like reference numerals.

FIG. 1 shows a top plan view of a vehicle frame 10, and axle housing 11, and the wheels 12 of a vehicle such as a small truck. The left in FIG. 1 represents the direction toward the front of the vehicle and the right in the figure represent the direction toward the rear of the vehicle. The vehicle includes an existing leaf spring suspension 13, and a supplemental suspension 14 according to the present invention. The supplemental suspension according to the present invention comprises two U-shaped suspension arm members 15,16. The arm members are mirror images of one another. The rear ends of arm members are pivotally attached to frame 10 by means of hangers 17. The front ends of arm members are attached to axle housing 11.

An I beam cross member 18 connects the arm members 15,16 beneath the vehicle frame 10. The I beam cross member 18 adds stability to the supplemental suspension while allowing significant, independent pivoting of the individual arm members 15,16.

FIG. 1 also shows the position of an existing leaf spring suspension system 13 with respect to the supplemental suspension system 14. Leaf springs 19 are suspended from the frame 10 by means of hangers 20,21. Leaf springs 19 are secured to the ax le housing 11 by means of U-bolt 22. As can be seen from the bottom of FIG. 1, for example, the rear portion of arm 15 hangs from hanger 17, the bottom of arm 15 passes diagonally underneath leaf springs 19, and the front of arm 15 rises up to rest on axle housing 11.

The specific shape of arm 15, and the functioning of the supplemental suspension is better illustrated with reference to FIG. 2. FIG. two is a partial cross section through the line 2—2 in FIG. 1. The section is taken through the axle housing 11. The front of the vehicle is to the left in the figure and the rear of the vehicle to the right. The portion of the suspension most clearly illustrated in FIG. 2 is that on the driver's side of the vehicle. The wheel 12 on the passengers side of the vehicle is seen as the furthest structure in the direction into the plane of the page in FIG. 2.

In FIG. 2, arm 15 can be seen suspended from hanger 17 by pivot point 23. The rear end of arm 15, to the right in FIG. 2, drops down from pivot point 23 and the bottom of arm 15 extends roughly parallel to frame 10 toward the front of the vehicle. The front end of arm 15 extends diagonally upward and outward toward the plane of the page, so that the front end of arm 15 passes underneath leaf springs 19 to come to rest on the axle housing 11. Vibration damping pad 24 serves to damp the axle vibration and wear pad 27 serves to minimize friction between arm 15 and axle housing 11. Further, vibration damping pad 24 and wear pad 27 serve to mount the front end of arm 15 onto the axle housing 11.

This embodiment of the present invention, in which the U-shaped arms are mounted to the axle housing 11 at a location between wheel 12 and U-bolt 22, is called an "outboard" mounting. The arms are therefore mounted outside of the existing spring assembly 19.

Some applications require mounting U-shaped arms 15, 16 "inboard" of the existing spring assembly 19. The front ends of arms 15, 16 are thereby mounted at a point on axle 11 directly beneath frame 10. This would eliminate the need for arms 15, 16 to extend outward beneath the spring assembly 19 as they extend upward to the top of axle 11.

Viewed from the top in FIG. 1, the front end of arm 15 rests on axle housing 11 between wheel 12 and the U-bolt 22 which attaches the leaf spring suspension to axle housing 11.

An I-beam connects the two arm members 15,16 at the bottoms of the members. The I-beam allows the arms 15,16 to be stabilized, yet allows significant independent rotation by torsion and flexure of the I-beam. An air bag 25 is attached to the arms, or I-beam, or both in the region of the bottom of the arms 15,16. A seat 26 is attached to the frame between the front and rear ends of the arm members 15,16 for allowing the air bags to be operatively connected, ie., mounted on or attached to the frame 10.

The method for supplementing the suspension of a vehicle and the functioning of the supplemental suspension will now be described in more detail.

In order to supplement the suspension of a motor vehicle according to the method of the present invention, one or more of the load-bearing springs of the leaf spring suspension are removed. The main leaf spring is left in its entirety, as are enough load bearing springs to be sufficient to control axle torque during heavy braking or operation of the vehicle. Hangers 17 are attached to the frame by bolting, welding, brazing or any other suitable means. Suspension arm members 15,16 are connected by I-beam 18, and an air bag 25 is mounted on the bottom of each suspension arm. Suspension arm members 15,16 are attached to hangers 17 so as to allow the arm members 15,16 to pivot around point 23 which is an axle, or pin. The front ends of suspension arms 15,16 are made to rest on the axle housing 11, and air springs, or air bags 25 are attached to the frame 10 of the vehicle by means of seat structure 26.

The seat structure 26 may be, for example, a pair of C-beams fixed to the frame and spanning the frame parallel to the axle housing 11. Air bags 25 are fixed to the arms 15,16 and I-beam 18 on the bottom.

When the supplemental suspension is in place, upward displacement of the axle housing 11 (toward the top of FIG. 2) causes the arms 15,16 to pivot around points 23, and the movement is dampened by air bags 25. Because the major load bearing springs have been removed, the damping is much smoother than with the leaf spring suspension by itself. However, the load bearing capacity of the vehicle is not compromised because the springs are replaced with the new supplemental suspension system.

The supplemental suspension system according to the present invention can be installed on a vehicle without much labor, and without sacrificing the factory tracking and alignment of the vehicle. As can be appreciated by one of skill in the art, the method of the present invention can be practiced on a drive axle or any other axle. With the exception of removing one or more load bearing springs, the existing suspension system is left virtually intact.

The invention has been illustrated by means of a preferred embodiment, but one of ordinary skill in the art will recognize that departures may be made while remaining within the spirit of the present invention. The scope of the invention is determined solely by the appended claims.

What is claimed is:

1. In a vehicle having an axle, wheels rotatably disposed on the axle, a frame and a suspension system for mounting the axle onto the frame, a supplementary air suspension system damping the movement of the axle with respect to the frame, comprising:
   a. first and second suspension frame members having front and rear ends;
   b. a cross member for connecting the two frame members;
   c. hanger means for pivotally suspending the rear ends of the frame members from the frame of the vehicle;
   d. mounting means for mounting the front ends of the frame members in a resting position on top of the axle; and
   e. air suspension means for operably connecting a portion of the suspension frame members disposed between the front and rear ends of the members to the vehicle frame.

2. An air suspension system as recited in claim 1, wherein the air suspension means further comprises air bags, wherein the degree of damping of the suspension means can be adjusted by altering the amount of air in the air bags.

3. An air suspension system as recited in claim 1, wherein the arm members have a generally "U" shape when viewed from a side of the vehicle, wherein one leg of the "U" shape comprises the rear end of the arm member for suspension from the hanger means, and the other leg of the "U" shape comprises the front end of the frame member for mounting on the axle, and wherein the air suspension means is disposed toward the bottom of the "U" shape.

4. An air suspension system as recited in claim 1, wherein the cross member comprises an "I" beam capable of substantial torsion along its long axis and is further used to support the air suspension means.

5. An air suspension system as recited in claim 1, wherein said existing suspension system comprises a pair of leaf springs mounted on the axle and suspended from first points on the vehicle frame between the front and rear ends of the arm members and second points on the vehicle frame in front of the front ends of the arm members, and wherein the front ends of the frame members are mounted on the axle at points between where the leaf spring are mounted on the axle and the wheels.

6. An air suspension system as recited in claim 1, wherein the mounting means comprises damping means for damping the axle vibration.

7. An air suspension system as recited in claim 1, further comprising a second cross member for attachment to the vehicle frame between the front and rear ends of the arm members, wherein the air suspension means is disposed between the first and second cross members and operatively connected to each of said cross members.

8. An air suspension system as recited in claim 1, wherein the axle is a non-drive axle.

9. A method for supplementing the suspension system of a vehicle having an axle, wheels rotatably disposed on the axle, a frame and a leaf spring suspension system for mounting the axle onto the frame, comprising the steps of:
   (a) removing one or more load bearing springs from the leaf spring suspension system;
   (b) attaching first and second hangers on the frame of the vehicle behind the axle with respect to a front of the vehicle;
   (c) suspending first and second generally U-shaped suspension arm members from the first and second hangers, respectively, wherein each of the first and second arm members has front and rear ends and a bottom, and wherein the rear end of each arm member is pivotally attached to a respective hanger;
   (d) resting the front end of each arm member on top of the axle;
   (e) providing air suspension means attached to the bottom of each arm and operatively connected to the frame.

10. A method as recited in claim 9, wherein a cross member is provided for connecting the two suspension arm members.

11. A method according to claim 9, further comprising the step of adjusting the air suspension means for providing a appropriate damping of the vehicle axle.

12. In a vehicle having an axle, wheels rotatably disposed on the axle, a frame and a suspension system for mounting the axle onto the frame, a supplementary air suspension system damping the movement of the axle with respect to the frame, comprising:
   a. first and second suspension frame members having front and rear ends;
   b. a cross member for connecting the two frame members;
   c. hanger means for pivotally suspending the rear ends of the frame members from the frame of the vehicle;
   d. mounting means for mounting the front ends of the frame members on the axle, the mounting means comprising:
      (i) damping means for damping axle vibration, and
      (ii) a wear pad for minimizing the friction between the axle and the frame members; and
   e. air suspension means for operably connecting a portion of the suspension frame members disposed between the front and rear ends of the members to the vehicle frame.

* * * * *